United States Patent [19]

Pastore

[11] 4,132,380
[45] Jan. 2, 1979

[54] CLIP MECHANISM AND WALL RETENTION DEVICE FOR CUP DISPENSING HOUSING OR SIMILAR ARTICLE

[75] Inventor: Ronald Pastore, Bedford, N.Y.

[73] Assignee: Cal Pak Industries, Inc., Stanford, Conn.

[21] Appl. No.: 856,215

[22] Filed: Dec. 1, 1977

[51] Int. Cl.² ............................................. F16M 13/00
[52] U.S. Cl. .................................................... 248/224.1
[58] Field of Search ................... 248/73, 221.3, 221.4, 248/224.1, 360, 475 A, 475 B; 222/180, 181

[56] References Cited

U.S. PATENT DOCUMENTS

| | | | |
|---|---|---|---|
| 1,840,138 | 1/1932 | Swallow | 248/221.3 |
| 1,894,146 | 1/1933 | Baker | 248/224.1 X |
| 2,897,928 | 8/1959 | Selig | 248/224.1 X |
| 2,939,613 | 6/1960 | Herman et al. | 222/181 |
| 3,389,883 | 6/1968 | Johnson | 248/360 X |

FOREIGN PATENT DOCUMENTS

| | | | |
|---|---|---|---|
| 2354551 | 5/1975 | Fed. Rep. of Germany | 248/475 A |
| 1510902 | 1/1968 | France | 222/180 |
| 1084850 | 9/1967 | United Kingdom | 248/475 A |

Primary Examiner—William H. Schultz
Attorney, Agent, or Firm—Arthur L. Plevy

[57] ABSTRACT

A wall bracket has a relatively planar back surface with first and second side walls extending therefrom at a given angle. The bracket has a closed bottom surface and a longitudinal slot is formed between the side walls. A clip mechanism has a back surface adapted for mounting on a dispenser and has two depending side walls extending therefrom at a given angle. The clip mechanism is slideably mounted in the wall bracket mechanism and based on the tapers of the side walls, can be pulled through the slot in the wall bracket to thus prevent damage to either bracket or the dispenser assembly.

10 Claims, 10 Drawing Figures

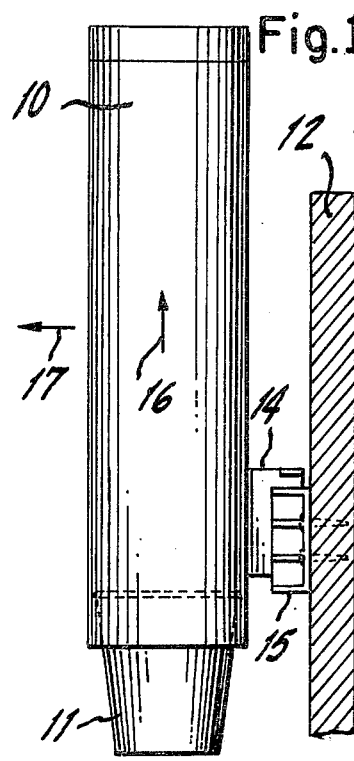
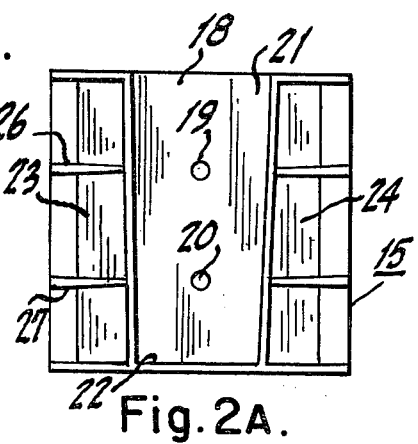
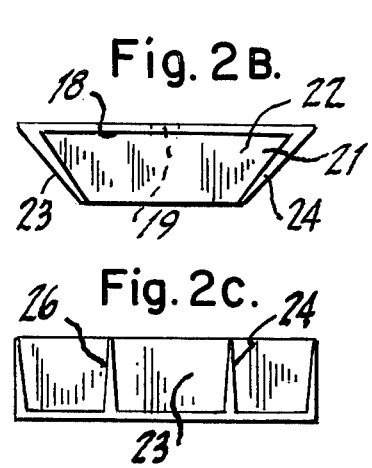
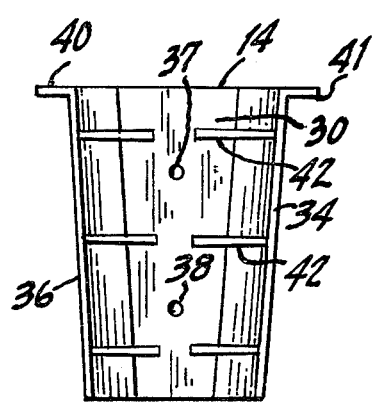
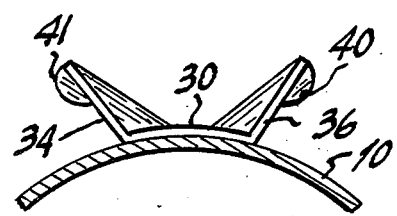
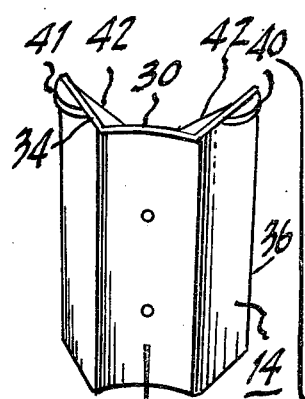
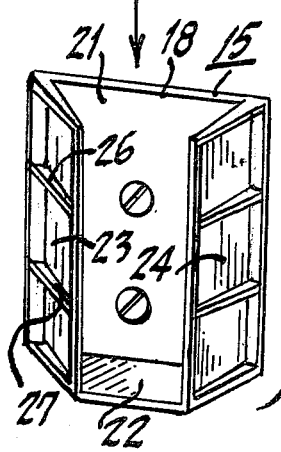
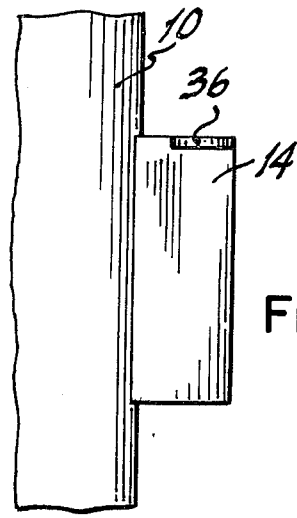

CLIP MECHANISM AND WALL RETENTION DEVICE FOR CUP DISPENSING HOUSING OR SIMILAR ARTICLE

BACKGROUND OF INVENTION

This invention relates to a fastening means in general and more particularly to a clip mechanism for securing a dispensing device to a wall to enable the same to be easily removed from the wall as desired and to prevent destruction of the device when pulled from the wall inadvertently or due to vandalism.

As one can ascertain, there is normally available in most business establishments as well as in chain restaurants and similar places, a dispenser to accommodate paper cups or similar articles to enable a consumer to help himself to the articles contained therein. Generally speaking, such dispensers in such commercial enterprises are fabricated from a stainless steel or other rust resistant material and have various mechanisms including brackets and clips to retain the dispensing units on the wall.

In any event, certain of these are permanently affixed to the wall by means of screws or bolts, while others can be removed from the wall by the use of a dual bracket arrangement; whereby one bracket is secured to the wall and a cooperating bracket secured to the dispensers. Such brackets enable the removal of the dispenser from the wall so that the operator of the establishment may wash or clean the same or add additional cups and so on.

A major problem experienced in the employment of such devices is that vandals pull the devices from the wall; which actions result in the loss of substantial amounts of money and requires continuous replacement of such devices. By pulling the device, the vandal usually distorts the clip mechanisms or may pull or may actually destroy the dispensing device when exerting such forces on the unit.

It is therefore an object of the present invention to provide an improved mounting mechanism for a dispenser to enable the easy removal of the same in a desired manner and to further provide an immediate release operation for forces applied to the dispenser which tend to pull the same from the wall.

BRIEF DESCRIPTION OF PREFERRED EMBODIMENT

A bracket and dispenser clip apparatus for slideably and removeably mounting a cup dispenser housing or similar article to a wall, comprising a wall bracket having a relatively planar back surface, first and second side walls extending from said planar surface at a given angle and sloping inwardly towards each other in the same plane, the distance between said side walls forming a slot above said back surface with said side walls being closer together at a bottom end of said back planar surface and further apart at a top end, and a bottom wall adjacent said bottom end of said back surface and overlying the bottom edges of said first and second side walls, a dispenser clip comprising a back arcuate section adapted to be mounted on a cup dispenser housing, said back section having depending therefrom at a right and left side, two outwardly sloping side walls each directed from a top to a bottom edge of said clip at a predetermined angle whereby said first and second side walls are further apart at said top end and closest together at said bottom end, said clip dimensioned so that said side walls can be slideably inserted between said side walls of said wall bracket with said bottom end of said clip coacting with said bottom wall of said bracket, to retain said clip and therefore said associated dispenser housing therein, said clip and bracket when coacting capable of being removed one from another via said slot between said side walls in said wall bracket by the exertion of a force relatively transverse to said clip and bracket.

BRIEF DESCRIPTION OF FIGURES

FIG. 1 is a side perspective view showing a cup dispenser mechanism secured to a wall by means of the clip and bracket arrangement according to this invention.

FIGS. 2A to 2D are front, top, bottom and side views of a wall bracket according to this invention.

FIG. 3 is a front view of a dispenser clip according to this invention.

FIGS. 3A to 3C are top, bottom and side views of the dispenser clip according to this invention.

FIG. 4 is a perspective view of wall bracket and clip mechanism for the purpose of showing the coaction of the apparatus.

DETAILED DESCRIPTION OF DRAWINGS

Referring to FIG. 1, there is shown a dispenser 10 of the type used to dispense cups as 11 or similar articles. The dispenser 10 is shown secured to a wall 12 by means of a first bracket or clip 14 coupled to the dispenser; which clip or bracket 14 is inserted into a wall mounted bracket 15. The bracket 15 is conveniently coupled to the wall 12 by means of suitable screws or bolts, as will be explained.

Essentially, as indicated, the bracket 14 is slideably mounted in the wall bracket 15 and the dispenser 10 can be removed by lifting the same in the direction of arrow 16. In any event, as indicated, if a force were exerted on the dispenser 10 in the direction of arrow 17, the operation of the clips 14 and 15 would enable an immediate release without destroying the dispenser or destroying either clip. This feature is not available in prior art brackets and mechanisms associated with such dispensing devices and hence, vandalism in attempting to pull such dispensers from the wall have caused great damage and destruction to such units as well as the associated prior art bracket or clip mechanisms.

Referring to FIG. 2A, there is shown a top view of the wall mounted bracket 15. Essentially, the bracket 15 has a back wall 18 which contains two apertures as 19 and 20 to accommodate suitable screws or bolts for securing the same to the wall.

The bracket as shown in FIG. 2B has an open top 21 and a bottom wall 22. Depending from opposite sides of the bottom wall 21 are two extending tapered side walls 23 and 24. The side walls extend from the bottom wall 22 to the top opening 21 at a slight angle so that the spacing between the edges of the walls 23 and 24 nearest the bottom wall 22 is less than the spacing between the edges near the top opening 21. The walls 23 and 24 are reinforced by means of supporting ribs as 26 and 27 located along the surfaces of the walls.

The walls 23 and 24 are at an angle of approximately forty-five degrees with respect to the back wall 18 of the clip 15. This angle, of course, can vary accordingly.

FIG. 2C shows a side view to clearly depict the nature of the side wall as 23. It is understood that the other wall 24 is of the same exact configuration.

FIG. 2D shows a bottom view showing the closed bottom wall 22 as described above.

The entire unit is integrally formed from a relatively strong plastic material having a certain flexibility as is conventional with plastics. As such, the bracket 15 can be integrally formed by an injection molding process using a theremosetting plastic; many examples of which exist and include phenolics, malamines, polyesters and epoxides and ureas as well as others which are extensively used throughout the plastics industry.

Shown in FIG. 3 is a top view of the bracket 14 which is attached to or integrally formed with the cylindrical portion of the dispenser 10. The bracket 14 has a central section 30 from which depends two angular arms 34 and 36. The arms 34 and 36 depend from the central portion 30 at a given angle; which in essence, is selected according to the angle at which the side walls 23 and 24 are formed at with respect to the back wall 18 of the bracket 15.

FIG. 3A shows a top view of the bracket 14; while FIG. 3B shows a bottom view of the bracket 14. A side view of the bracket 14 is shown in FIG. 3C and it is noted that the bracket 14 may be integrally formed with the cylindrical dispenser 10 or may be secured thereto by means of bolts or screws via apertures as 37 and 38 in the central portion 30 of the bracket 14.

Essentially, as clearly shown in FIG. 4, the bracket 14 can be inserted into the wall bracket 15. The bottom wall 22 of the bracket 15 assures that the dispenser will be firmly held and the tapered side walls 34 and 36 of bracket 14 enable the easy placement and removal of the same.

The bracket 14 is also fabricated from a relatively strong plastic material as above indicated. The bracket 14 also has two extending tabs 40 and 41 which are integrally formed with the walls 34 and 36 to enable one to grip the same to facilitate removal and has internal supporting ribs as 42 along the walls 34 & 36. The structure of the brackets is such that for a force applied as force 17 of FIG. 1 which would tend to pull the dispenser from the wall, the walls 23 and 25 of the bracket 15 will be pushed outwards near the top end. Similarly, the walls 34 and 36 of bracket 14 will tend to compress or be forced inwards. The result is that the bracket 14 is first forced through the opening of bracket 15 between walls 23 and 24. As soon as this occurs, the next lower section of bracket 14 slides accordingly until the entire bracket 14 is pulled through the tapered slot formed between walls 23 and 24 of bracket 15. This action is afforded by the slight angles at which the walls 23 and 24 are formed on the back surface 18 of the bracket 15 as well as the tapered configuration associated with walls 34 and 36 of bracket 14. Accordingly, due to the slight elastomeric properties of the plastic material and based on the nature of the tapers thus described, the brackets when subjected to a force in the direction of force 17 will immediately disengage one from the other without destruction of either bracket and without removal of bracket 15 from the wall or bracket 14 from the dispenser. It is this action based on the configuration shown which prevents the above described damage from occurring and therefore avoids the destruction attendant with the prior art mechanisms.

In a particular construction, the clip 15 is approximately 5 centimeters wide by 5.2 centimeters in length with a height of about 1.5 centimeters. The width of the slot formed between walls 23 and 24 is approximately 2.5 centimeters at the top opening 21 and 2 centimeters at the bottom wall 22. The clip 14 is approximately 5.6 centimeters in length, 1.4 centimeters in height. The distance between walls 34 and 36 at the bottom end is approximately 2.5 centimeters, while the distance between the walls near the top end adjacent tabs is approximately 3.5 centimeters.

I claim:

1. A bracket and dispenser clip apparatus for slideably and removeably mounting a cup dispenser housing or similar article to a wall, comprising:
   (a) a flexible, plastic wall bracket having a relatively planar back surface, first and second side walls extending from said planar surface at a given angle and sloping inwardly towards each other in the same plane, the distance between said side walls forming a slot with said back surface with said side walls being closer together at a bottom end of said back planar surface and further apart at a top end, and a bottom wall adjacent said bottom end of said back surface and overlying the bottom-edges of said first and second side walls,
   (b) a dispenser clip comprising a back arcuate section positioned on a cup dispenser housing, said back section having depending therefrom at a right and left side, two outwardly sloping side walls each directed from a top to a bottom end of said clip at a predetermined angle whereby said first and second side walls are further apart at said top end and closest together at said bottom end, said clip dimensioned so that said side walls can be slideably inserted between said side walls of said wall bracket with said bottom end of said clip coacting with said bottom wall of said bracket to retain said clip and therefore said associated dispenser housing therein, said clip and bracket when coacting, capable of being removed one from another via said slot between said side walls in said wall bracket by the exertion of a force relatively transverse to said clip and bracket.

2. The bracket and dispenser clip apparatus according to claim 1 wherein both said bracket and clip are integrally fabricated from a plastic.

3. The bracket and dispenser clip apparatus according to claim 1 wherein said clip is integrally formed with said dispenser housing.

4. The bracket and dispenser clip apparatus according to claim 1 wherein said planar back surface of said bracket includes at least one aperture adapted to accommodate a suitable fastening means for securing said bracket to a wall.

5. The bracket and dispensing clip apparatus according to claim 1 wherein said clip has first and second projections extending from said sloping side walls at the top end of said clip.

6. The bracket and dispenser clip apparatus according to claim 1 wherein said side walls of said wall bracket include supporting ribs spaced at equal intervals along said side walls from said top to said bottom end.

7. The apparatus according to claim 1 wherein first and second side walls as extending from said back planar surface are at an angle of relatively forty-five degrees with respect thereto.

8. The apparatus according to claim 1 wherein said first and second side walls are of a relatively triangular cross-section being wider nearest said planar back surface and narrower nearest said slot.

9. The apparatus according to claim 1 wherein said cup dispenser housing is a longitudinal cylindrical member fabricated from plastic.

10. The apparatus according to claim 1 wherein said back section of said clip has means located on said surface opposite to that including said side walls for securing said section to said dispenser.

* * * * *

Adverse Decision In Interference

Patent No. 5,132,380, James C. Stevens, David R. Neithamer, METAL COMPLEX COMPOUNDS, Interference No. 103,114, final judgment adverse to the patentees rendered September 28, 2001, as to claims 1, 2 and 4-9.

*(Official Gazette December 18, 2001)*